United States Patent
Choi et al.

(10) Patent No.: US 12,006,257 B2
(45) Date of Patent: *Jun. 11, 2024

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Suyeon Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

This patent is subject to a terminal disclaimer.

(21) Appl. No.: 16/795,959

(22) Filed: Feb. 20, 2020

(65) Prior Publication Data
US 2020/0270168 A1 Aug. 27, 2020

(30) Foreign Application Priority Data
Feb. 22, 2019 (KR) .................. 10-2019-0021145

(51) Int. Cl.
*B32B 15/04* (2006.01)
*B32B 17/06* (2006.01)
(Continued)

(52) U.S. Cl.
CPC .............. *C03C 8/06* (2013.01); *C03C 3/066* (2013.01); *C03C 3/068* (2013.01); *C03C 3/115* (2013.01);
(Continued)

(58) Field of Classification Search
CPC .................................................. F24C 15/005
(Continued)

(56) References Cited

U.S. PATENT DOCUMENTS 3,547,098 A 12/1970 Lee
3,580,733 A 5/1971 Ott
(Continued)

FOREIGN PATENT DOCUMENTS

AU 2370367 1/1969
BG 98027 3/1994
(Continued)

OTHER PUBLICATIONS

KR20130125918 English Machine Translation.*
(Continued)

*Primary Examiner* — Lauren R Colgan
(74) *Attorney, Agent, or Firm* — KED & ASSOCIATES, LLP

(57) ABSTRACT

An enamel composition, a method for preparing an enamel composition, and a cooking appliance are provided. The enamel composition may include 15 to 50 wt % of silicon dioxide ($SiO_2$); 1 to 10 wt % of boron oxide ($B_2O_3$); 10 to 20 wt % of at least one of lithium oxide ($Li_2O$), sodium oxide ($Na_2O$), or potassium oxide ($K_2O$); 1 to 5 wt % of sodium fluoride (NaF); 1 to 10 wt % of zinc oxide (ZnO); and 20 to 50 wt % of at least one of titanium dioxide ($TiO_2$), molybdenum oxide ($MoO_3$), bismuth oxide ($Bi_2O_3$), cerium dioxide ($CeO_2$), manganese dioxide ($MnO_2$), or Iron oxide ($Fe_2O_3$), which provides an enamel composition with a reduced cleaning time, and facilitates cleaning without soaking in water.

2 Claims, 4 Drawing Sheets

(51) Int. Cl.

| | |
|---|---|
| *C03C 3/066* | (2006.01) |
| *C03C 3/068* | (2006.01) |
| *C03C 3/115* | (2006.01) |
| *C03C 8/06* | (2006.01) |
| *C03C 17/04* | (2006.01) |
| *F24C 15/00* | (2006.01) |
| *F24C 15/02* | (2006.01) |
| *C23D 5/02* | (2006.01) |
| *C23D 5/04* | (2006.01) |

(52) U.S. Cl.
CPC ............ *C03C 17/04* (2013.01); *F24C 15/005* (2013.01); *F24C 15/02* (2013.01); *C03C 2207/04* (2013.01); *C03C 2218/17* (2013.01); *C23D 5/02* (2013.01); *C23D 5/04* (2013.01)

(58) Field of Classification Search
USPC .......................................................... 428/426
See application file for complete search history.

(56) References Cited

U.S. PATENT DOCUMENTS

| | | |
|---|---|---|
| 3,718,498 A | 2/1973 | Denny et al. |
| 4,084,975 A | 4/1978 | Faust |
| 4,147,835 A | 4/1979 | Nishino et al. |
| 4,180,482 A | 12/1979 | Nishino et al. |
| 4,460,630 A | 7/1984 | Nishino et al. |
| 4,515,862 A | 5/1985 | Maki et al. |
| 4,877,758 A | 10/1989 | Lee et al. |
| 5,650,364 A | 7/1997 | Münstedt et al. |
| 5,747,395 A | 5/1998 | Smith et al. |
| 6,123,874 A | 9/2000 | Fukaya et al. |
| 6,321,569 B1 | 11/2001 | Sreeram et al. |
| 6,350,495 B1 | 2/2002 | Schriener et al. |
| 6,429,161 B1* | 8/2002 | Souchard ............... F24C 15/005 501/78 |
| 6,511,931 B1* | 1/2003 | Baldwin ................ F24C 15/005 501/24 |
| 6,566,289 B2 | 5/2003 | Aronica et al. |
| 6,652,972 B1 | 11/2003 | Conzone et al. |
| 6,881,690 B2 | 4/2005 | Kawamura et al. |
| 6,924,246 B2 | 8/2005 | Kato et al. |
| 7,763,557 B2 | 7/2010 | Baldwin et al. |
| 8,815,347 B2 | 8/2014 | Shimoda et al. |
| 11,401,201 B2 | 8/2022 | Gwoo |
| 2003/0064874 A1* | 4/2003 | Eckmann ................... C03C 8/02 501/67 |
| 2003/0119647 A1 | 6/2003 | Sanichi et al. |
| 2003/0162646 A1 | 8/2003 | Kawamura et al. |
| 2003/0187118 A1 | 10/2003 | Aronica et al. |
| 2004/0043053 A1 | 3/2004 | Yu et al. |
| 2004/0069764 A1 | 4/2004 | Imai et al. |
| 2004/0077477 A1 | 4/2004 | Gazo |
| 2005/0014625 A1 | 1/2005 | Espargilliere et al. |
| 2005/0148722 A1 | 7/2005 | Aronica et al. |
| 2008/0044488 A1 | 2/2008 | Zimmer et al. |
| 2009/0311514 A1* | 12/2009 | Shon ........................ C03C 8/08 501/24 |
| 2010/0009836 A1 | 1/2010 | Sakoske |
| 2010/0009837 A1 | 1/2010 | Sakoske |
| 2010/0264126 A1 | 10/2010 | Baek et al. |
| 2011/0011423 A1 | 1/2011 | Baek et al. |
| 2011/0049122 A1 | 3/2011 | Baek et al. |
| 2011/0174826 A1 | 7/2011 | Le Bris et al. |
| 2011/0262758 A1 | 10/2011 | Benford, Jr. et al. |
| 2011/0277505 A1 | 11/2011 | Sakoske |
| 2013/0045389 A1* | 2/2013 | Benford, Jr. ............. C03C 3/118 428/433 |
| 2013/0149444 A1 | 6/2013 | Le Bris et al. |
| 2013/0299482 A1 | 11/2013 | Kim et al. |
| 2013/0299484 A1* | 11/2013 | Lee ............................ C03C 8/02 501/14 |
| 2015/0083109 A1 | 3/2015 | Baek et al. |
| 2016/0244356 A1 | 8/2016 | Lecomte et al. |
| 2018/0170797 A1 | 6/2018 | Gorecki et al. |
| 2018/0201538 A1* | 7/2018 | De Strycker ........... C03C 3/066 |
| 2018/0215654 A1* | 8/2018 | Choi ..................... F24C 15/005 |
| 2018/0215655 A1* | 8/2018 | Kim ........................ C03C 3/066 |
| 2019/0002336 A1 | 1/2019 | Kim et al. |
| 2019/0071347 A1 | 3/2019 | Kim et al. |
| 2019/0092680 A1* | 3/2019 | Kim ........................ C03C 3/066 |
| 2019/0337837 A1 | 11/2019 | Kim et al. |
| 2020/0115274 A1 | 4/2020 | Awagakubo et al. |
| 2020/0148583 A1 | 5/2020 | Choi et al. |
| 2020/0270167 A1 | 8/2020 | Choi et al. |
| 2020/0270168 A1 | 8/2020 | Choi et al. |
| 2020/0270170 A1* | 8/2020 | Gwoo ..................... C03C 3/062 |
| 2020/0270171 A1* | 8/2020 | Gwoo ....................... C03C 8/08 |
| 2021/0171389 A1 | 6/2021 | Choi |

FOREIGN PATENT DOCUMENTS

| | | |
|---|---|---|
| CN | 1042890 | 6/1990 |
| CN | 1105343 | 7/1995 |
| CN | 1108626 | 9/1995 |
| CN | 1176942 | 3/1998 |
| CN | 1487240 | 4/2004 |
| CN | 1892962 | 1/2007 |
| CN | 101067207 | 11/2007 |
| CN | 101094818 | 12/2007 |
| CN | 101182119 | 5/2008 |
| CN | 101519275 | 9/2009 |
| CN | 101519276 | 9/2009 |
| CN | 101734858 | 6/2010 |
| CN | 102066011 | 5/2011 |
| CN | 102086091 | 6/2011 |
| CN | 102089253 | 6/2011 |
| CN | 102219383 | 10/2011 |
| CN | 102368933 | 3/2012 |
| CN | 102369168 | 3/2012 |
| CN | 102422085 | 4/2012 |
| CN | 102517582 | 6/2012 |
| CN | 104891805 | 9/2015 |
| CN | 104891810 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| CN | 108863074 | 11/2018 |
| EP | 0 086 109 | 8/1983 |
| EP | 0 453 897 | 10/1991 |
| EP | 0 565 941 | 10/1993 |
| EP | 1 160 283 | 12/2001 |
| EP | 1 256 556 | 11/2002 |
| EP | 1 298 099 | 4/2003 |
| EP | 1 559 692 | 8/2005 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| EP | 3 699 156 | 8/2020 |
| EP | 3 786 122 | 3/2021 |
| GB | 1 214 261 | 12/1970 |
| HU | 01 00796 | 8/2002 |
| JP | S54-77618 | 6/1979 |
| JP | S54-106529 | 8/1979 |
| JP | S54-153819 | 10/1979 |
| JP | S55-75740 | 6/1980 |
| JP | S56-78450 | 6/1981 |
| JP | S63-230537 | 9/1988 |
| JP | S63-230538 | 9/1988 |
| JP | 2001-080935 | 3/2001 |
| JP | 2001-303276 | 10/2001 |
| JP | 2002-367510 | 12/2002 |
| JP | 2003-206417 | 7/2003 |
| JP | 2004-269322 | 9/2004 |
| JP | 2004-358846 | 12/2004 |
| JP | 2005-008974 | 1/2005 |
| JP | 2014-148465 | 8/2014 |
| JP | 2014-221937 | 11/2014 |

(56) References Cited

FOREIGN PATENT DOCUMENTS

| | | |
|---|---|---|
| JP | 2016-030849 | 3/2016 |
| KR | 10-2011-0023079 | 3/2011 |
| KR | 10-2013-0125907 | 11/2013 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089986 | 8/2018 |
| KR | 10-2018-0089988 | 8/2018 |
| KR | 10-2019-0027128 | 3/2019 |
| KR | 10-2019-0071660 | 6/2019 |
| KR | 10-2019-0120965 | 10/2019 |
| KR | 10-2019-0123571 | 11/2019 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2011/108472 | 9/2011 |
| WO | WO 2017/058418 | 4/2017 |
| WO | WO 2018/143704 | 8/2018 |
| WO | WO 2018/198986 | 11/2018 |
| WO | WO 2019/203565 | 10/2019 |
| WO | WO 2019/208969 | 10/2019 |

OTHER PUBLICATIONS

United States Office Action dated Mar. 25, 2021 issued in co-pending related U.S. Appl. No. 16/666,979.
United States Office Action dated Apr. 6, 2021 issued in co-pending related U.S. Appl. No. 16/676,903.
Chinese Office Action dated Jul. 26, 2021 issued in CN Application No. 1911042287.3.
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
Chinese Notice of Allowance dated May 10, 2022.
U.S. Appl. No. 16/796,066, filed Feb. 20, 2020.
U.S. Appl. No. 16/796,075, filed Feb. 20, 2020.
U.S. Appl. No. 16/796,127, filed Feb. 20, 2020.
Chinese Notice of Allowance dated Mar. 28, 2022 issued in CN Application No. 202010107406.5.
Chinese Notice of Allowance dated Mar. 29, 2022 issued in CN Application No. 202010107396.5.
Chinese Notice of Allowance dated Mar. 29, 2022 issued in CN Application No. 202010107479.4.
Chinese Notice of Allowance dated Mar. 29, 2022 issued in CN Application No. 202010107767.X.
Chinese Notice of Allowance dated Mar. 29, 2022 issued in CN Application No. 202010107792.8.
United States Notice of Allowance dated Nov. 23, 2021 issued in co-pending related U.S. Appl. No. 16/795,923.
U.S. Appl. No. 16/666,979, filed Oct. 29, 2019.
U.S. Appl. No. 16/676,903, filed Nov. 7, 2019.
Korean Office Action dated Feb. 5, 2020 issued in Application No. 10-2018-0132225.
European Search Repot dated Mar. 24, 2020 issued in Application No. 19205924.4.
U.S. Appl. No. 16/795,923, filed Feb. 20, 2020.
European Search Report dated Mar. 24, 2020 issued in Application No. 19207979.6.
Korean Office Action dated Feb. 14, 2020 issued in Application No. 10-2018-0137475.
United States Office Action dated Apr. 4, 2022 issued in co-pending related U.S. Appl. No. 16/796,127.
Korean Office Action dated May 8, 2020 issued in KR Application No. 10-2019-0021139.
Korean Office Action dated May 11, 2020 issued in KR Application No. 10-2019-0021140.
Korean Office Action dated May 11, 2020 issued in KR Application No. 10-2019-0021141.
Korean Office Action dated May 12, 2020 issued in KR Application No. 10-2019-0021142.
Korean Office Action dated May 13, 2020 issued in KR Application No. 10-2019-0021143.
Korean Office Action dated May 13, 2020 issued in KR Application No. 10-2019-0021144.
Korean Office Action dated May 13, 2020 issued in KR Application No. 10-2019-0021145.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.
Korean Notice of Allowance dated Jul. 27, 2020 issued in KR Application No. 10-2019-0021140.
Korean Notice of Allowance dated Jul. 27, 2020 issued in KR Application No. 10-2019-0021144.
Korean Notice of Allowance dated Jul. 27, 2020 issued in KR Application No. 10-2019-0021145.
Korean Notice of Allowance dated Jul. 29, 2020 issued in KR Application No. 10-2019-0021141.
Korean Notice of Allowance dated Jul. 30, 2020 issued in KR Application No. 10-2019-0021143.
U.S. Appl. No. 16/795,959, filed Feb. 20, 2020.
U.S. Appl. No. 16/796,052, filed Feb. 20, 2020.
U.S. Appl. No. 16/796,102, filed Feb. 20, 2020.
U.S. Office Action issued in U.S. Appl. No. 16/796,052 dated Oct. 5, 2022.

* cited by examiner

ENAMEL COMPOSITION, METHOD FOR PREPARING ENAMEL COMPOSITION, AND COOKING APPLIANCE

CROSS-REFERENCE TO RELATED APPLICATION(S)

The present disclosure claims priority to and the benefit of Korean Patent Application No. 10-2019-0021145, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamels may be prepared by applying a glass glaze to a surface of a metal plate. Enamels may be used in cooking appliances, such as microwaves and ovens. Cooking appliances, such as microwaves and gas ovens, may cook food or other items (hereinafter, collectively "food") using a heating source. As contaminants generated during the cooking may be adhered to an inner wall of a cavity of the cooking appliance, the inner wall of the cavity thereof may be cleaned. The enamel may be coated on a surface of the inner wall of the cavity of the cooking appliances to facilitate removal of contaminants from the cooking appliances. For example, pyrolysis methods for burning contaminants at high temperatures to ashes may be used to easily clean the inner wall of the cavity. The enamel composition including components, such as phosphorus pentoxide ($P_2O_5$), silicon dioxide ($SiO_2$), and boron oxide ($B_2O_3$) may be used with pyrolysis methods.

Other enamel compositions may have greater energy consumption because cleaning may be performed by heating for about four hours under high temperature conditions, for example, a temperature range of 450 to 500° C. for pyrolysis. Other enamel compositions may require a soaking process in water for a certain period of time in order to remove oil contaminants, such as beef, pork, and poultry, thereby resulting in a complicated cleaning processes. The enamel composition may not be deformed and damaged at a high temperature range of 450 to 500° C.; however, other enamel compositions have degraded durability at high temperatures.

BRIEF DESCRIPTION OF THE DRAWINGS

Embodiments will be described in detail with reference to the following drawings in which like reference numerals refer to like elements, and wherein.

DETAILED DESCRIPTION

Enamel Composition

Figure 1:
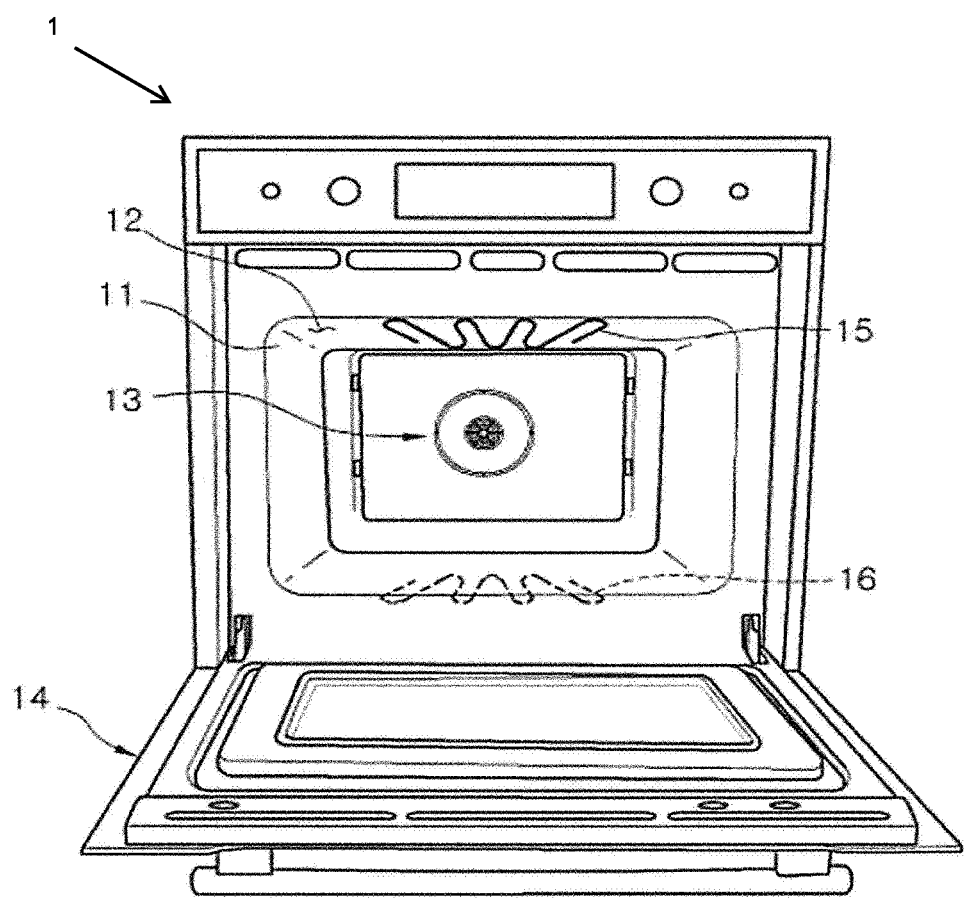
FIG. 1 is a front perspective view of a cooking appliance according to an embodiment.

An enamel composition, according to embodiments, may include 15 to 50 wt % of silicon dioxide ($SiO_2$); 1 to 10 wt % of boron oxide ($B_2O_3$); 10 to 20 wt % of at least one of lithium oxide ($Li_2O$), sodium oxide ($Na_2O$), or potassium oxide ($K_2O$); 1 to 5 wt % of sodium fluoride (NaF); 1 to 10 wt % of zinc oxide (ZnO); and 20 to 50 wt % of at least one of titanium dioxide ($TiO_2$), molybdenum oxide ($MoO_3$), bismuth oxide ($Bi_2O_3$), cerium dioxide ($CeO_2$), manganese dioxide ($MnO_2$), or Iron oxide ($Fe_2O_3$).

$SiO_2$ forms a glass structure and may be used to improve chemical resistance of the enamel composition by strengthening a skeleton of the glass structure and to facilitate achievement of properties of metal oxide which functions as a catalyst. As the catalytic metal oxide is inferior in heat resistance or chemical resistance to other components, a large amount of catalytic metal oxide may not be included in the enamel composition. However, $SiO_2$ may be used in an appropriate amount in the glass to improve solubility of the catalytic metal oxide due to a greater pore size of $SiO_2$. Accordingly, the heat resistance and the chemical resistance thereof may be improved and properties of the catalytic metal oxide may be achieved by properly adjusting a content ratio of each of $SiO_2$ and the catalytic metal oxide. $SiO_2$ may be contained in the enamel composition in a range of 15 to 50 wt %. If the content of $SiO_2$ exceeds 50 wt %, the addition of other components may be prevented, thereby degrading a cleaning performance. If the content of $SiO_2$ is less than 15 wt %, silicate-based glass composition according to embodiments may be disrupted.

$B_2O_3$ functions as a glass-forming agent and may function to uniformly dissolve the components of the enamel composition. $B_2O_3$ may improve a coating performance of the enamel composition by controlling a coefficient of thermal expansion and fusion flow of the enamel composition. $B_2O_3$ may maintain an appropriate viscosity during an enamel firing process and control the glass composition such that crystallization does not occur. $B_2O_3$ may be contained in the enamel composition in a range of 1 to 10 wt %. If the content of $B_2O_3$ exceeds 10 wt %, the addition of other components may be prevented, thereby degrading a cleaning performance. If the content of $B_2O_3$ is less than 1 wt %, the glass composition may be disrupted or crystallization of the glass composition may occur.

$Li_2O$, $Na_2O$, and $K_2O$ each functions to improve the cleaning performance using the enamel composition. At least one of $Li_2O$, $Na_2O$, or $K_2O$ may be contained in the enamel composition in a range of 10 to 20 wt %. When the content of the at least one of $Li_2O$, $Na_2O$, or $K_2O$ exceeds 20 wt %, a coating performance of the coating layer may be degraded due to a significantly increased coefficient of thermal expansion of the glass. If the content of the at least one of $Li_2O$, $Na_2O$, or $K_2O$ is less than 10 wt %, the cleaning function performance may be degraded.

NaF also functions to improve the cleaning performance using the enamel composition. NaF is contained in the enamel composition in a range of 1 to 5 wt %. If the content of NaF exceeds 5 wt %, the addition of other components may be prevented, thereby degrading durability thereof. If the content of NaF is less than 1 wt %, the cleaning performance may be degraded.

In embodiments, $SiO_2$ and $B_2O_3$ each functions as a network forming oxide and the alkali metal oxide described above functions as a network modifying oxide, and ZnO functions as an intermediate oxide for balancing the two metal oxides. In embodiments, ZnO may be contained in the enamel composition in the range of 1 to 10 wt %. If the content of ZnO exceeds 10 wt %, vitrification of the enamel composition may be difficult and thermal properties of the enamel composition may be degraded. If the content of ZnO is less than 1 wt %, an ability of the enamel composition to spread during firing may be degraded, resulting in a non-uniform coating, such that surface properties and a coating performance of the coating layer may be degraded.

At least one of $TiO_2$, $MoO_3$, $Bi_2O_3$, $CeO_2$, $MnO_2$, or $Fe_2O_3$ improves the cleaning performance with respect to contaminants, such as oils and sugars. In embodiments, the at least one of $TiO_2$, $MoO_3$, $Bi_2O_3$, $CeO_2$, $MnO_2$, or $Fe_2O_3$ may be contained in the enamel composition in a range of 20 to 50 wt %. If the at least one of $TiO_2$, $MoO_3$, $Bi_2O_3$, $CeO_2$, $MnO_2$, or $Fe_2O_3$ exceeds 50 wt %, the addition of other components may be prevented, thereby degrading durability, such as heat resistance and chemical resistance. If the at least one of $TiO_2$, $MoO_3$, $Bi_2O_3$, $CeO_2$, $MnO_2$, or $Fe_2O_3$ is less than 20 wt %, the cleaning performance with respect to contaminants, such as oils and sugars, may be degraded. According to embodiments, the enamel composition may include 5 to 20 wt % of $TiO_2$ and 10 to 20 wt % of at least one of $MoO_3$, $Bi_2O_3$, or $CeO_2$ so as to provide an optimal silicate-based composition ratio such that the enamel composition facilitates cleaning and has durability, such as heat resistance and chemical resistance thereof. In some examples, in order to provide an enamel composition that facilitates cleaning and has excellent durability, for example, $MoO_3$, $Bi_2O_3$, and $CeO_2$ may be contained in the enamel composition.

According to embodiments, the enamel composition may be coated on a buffer layer formed on a base steel sheet and may not include relatively expensive Ni and Co components. Accordingly, according to embodiments, the enamel composition may facilitate cleaning and have excellent durability at an economical price.

As mentioned above, other enamel compositions have greater energy consumption because such enamel compositions are heated for about four hours under high temperature conditions, for example, in a temperature range of 450 to 500° C. for pyrolysis to perform cleaning. According to embodiments, the enamel composition has the above-mentioned novel composition ratio such that contaminants containing sugars may be removed by heating for one hour or less at high temperature conditions, for example, a temperature range of 450 to 500° C. for pyrolysis. Accordingly, according to embodiments, the enamel composition may be used to save energy and shorten the cleaning time. According to embodiments, the enamel composition may facilitate the cleaning without soaking in water at room temperature and may facilitate hygiene management of cooking appliances.

Method for Preparing Enamel Composition

According to embodiments, a method 100 for preparing an enamel composition includes providing materials for the enamel composition (110) including 15 to 50 wt % of $SiO_2$; 1 to 10 wt % of $B_2O_3$; 10 to 20 wt % of at least one of $Li_2O$, $Na_2O$, or $K_2O$; 1 to 5 wt % of NaF; 1 to 10 wt % of ZnO; and 20 to 50 wt % of at least one of $TiO_2$, $MoO_3$, $Bi_2O_3$, $CeO_2$, $MnO_2$, or $Fe_2O_3$; melting the materials (120); and quenching the melted materials (130) to prepare the enamel composition.

After the components of the enamel composition are sufficiently mixed, the materials are melted. In some examples, the enamel composition may be melted in a temperature range of 1200 to 1400° C. In some examples, the enamel composition may be melted for 1 to 2 hours. Subsequently, the melted materials may be chilled by a chiller using a quenching roller.

Cooking Appliance

According to embodiments, an enamel composition may be coated on a surface of a target object. The target object may be a metal plate, a glass plate, or portion or all of a cooking appliance, for example. The enamel composition may be coated on an inner surface of a cavity of the cooking appliance or an inner surface of a door of the cooking appliance.

Referring to FIG. 1, according to embodiments, a cooking appliance 1 may include a cavity 11 that defines a cooking chamber, a door 14 that selectively opens and closes the cooking chamber, at least one of heating sources 13, 15, and 16 that provides heat to the cooking chamber, a buffer layer 19 coated on an inner surface 12 of the cavity 11, a buffer layer 20 coated on an inner surface of the door 14, and coating layers 17 and 18 formed using the enamel composition according to embodiments.

The cavity 11 may have a hexahedral shape and have an open front surface. The heating sources 13, 15, and 16 may include a convection assembly 13 that discharges heated air into the cavity 11, an upper heater 15 disposed at an upper portion of the cavity 11, and a lower heater 16 disposed at a lower portion of the cavity 11. The upper heater 15 and the lower heater 16 may be provided inside or outside of the cavity 11. The heating sources 13, 15, and 16 may not necessarily include the convection assembly 13, the upper heater 15, and the lower heater 16. For example, the heating sources 13, 15, and 16 may include at least one of the convection assembly 13, the upper heater 15, or the lower heater 16.

Figure 2:
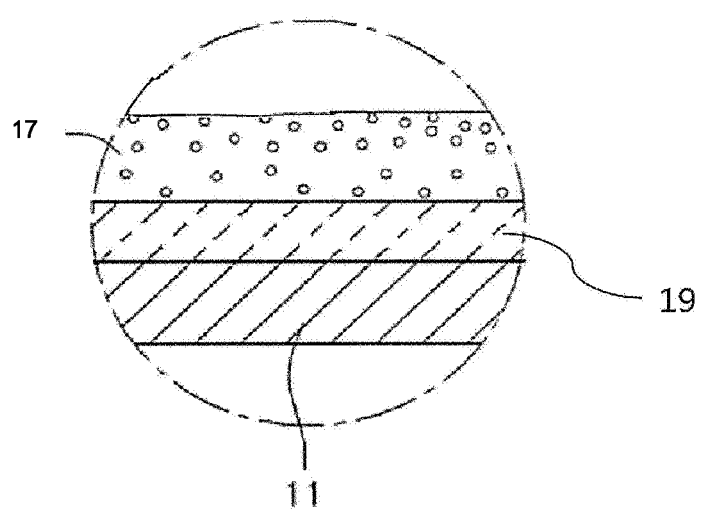
FIG. 2 is a partial enlarged cross-sectional view of a portion of an inner surface of a cavity of the cooking appliance in FIG. 1.
Figure 3:
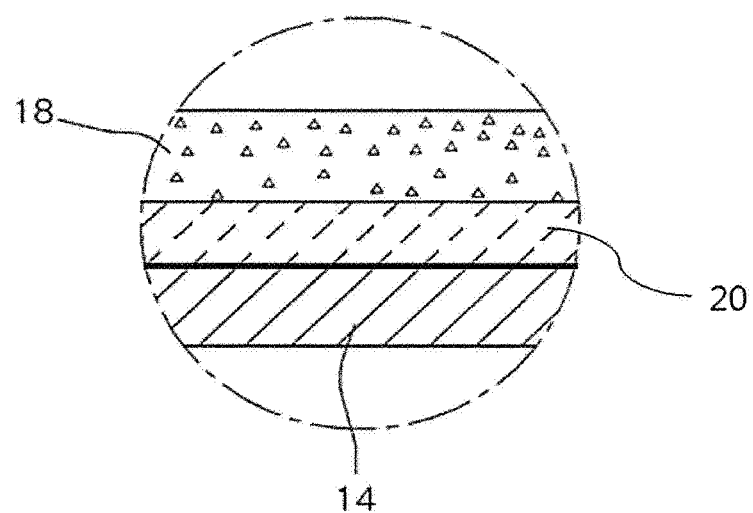
FIG. 3 is a partial enlarged cross-sectional view of a portion of an inner surface of a door of the cooking appliance in FIG. 1.
Figure 4:
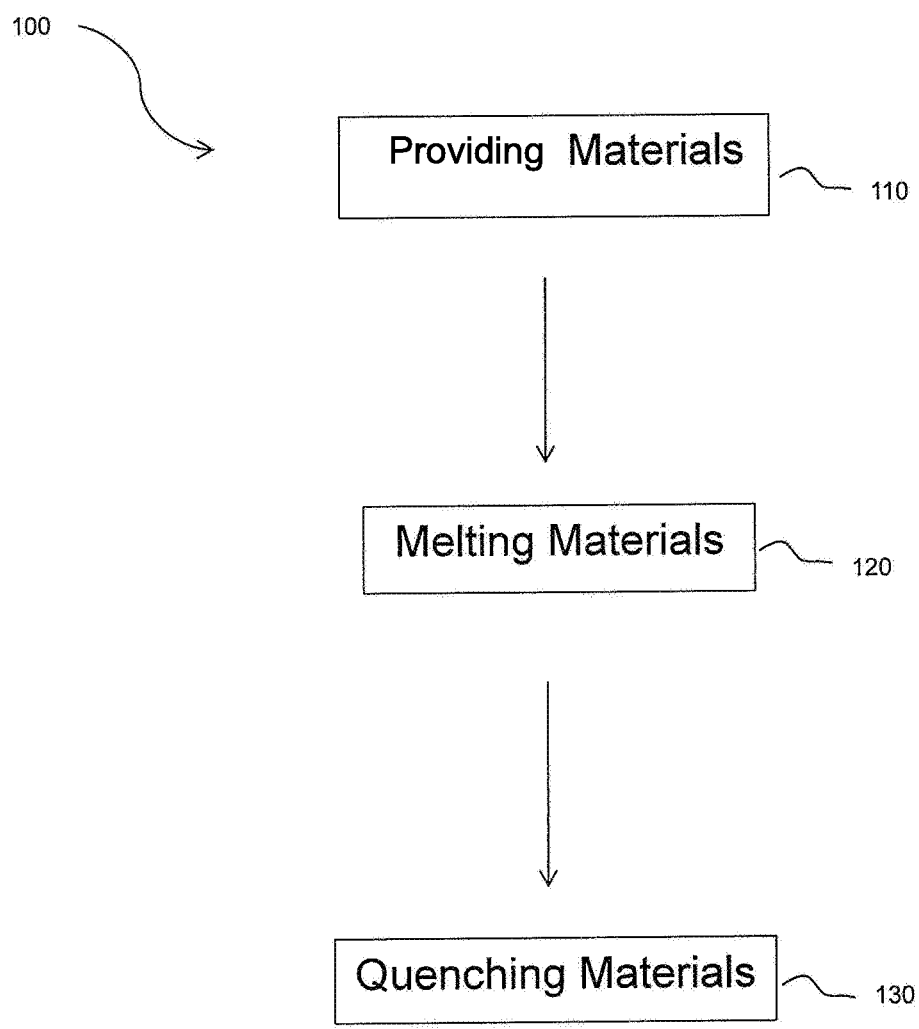
FIG. 4 is a flow chart of a method for preparing an enamel composition according to an embodiment.

According to embodiments, referring to FIGS. 2 and 3, the enamel composition may be coated on the inner surface of the cavity 11 or the inner surface of the door 14 of the cooking appliance 1 through a dry process or a wet process, for example. The cavity 11 and the door 14 may each be made of a metal plate. Buffer layers 19 and 20 may be formed on surfaces of the cavity 11 and the door 14. According to embodiments, the coating layers 17 and 18 formed using the enamel composition may be coated on the buffer layers 19 and 20.

The buffer layers 19 and 20 may each be formed as a coating layer having similar components to the components of the enamel composition. The buffer layers 19 and 20 may each be made of a material having a same thermal expansion coefficient as a base steel sheet and a material having excellent adhesion with the base steel sheet.

In the dry process, the enamel composition is dispersed in an organic binder and the mixed enamel composition and organic binder are milled in a ball mill to prepare a glass frit. In the wet process, the enamel composition is dispersed in water ($H_2O$) and pigment, and the mixed enamel composition, water ($H_2O$), and pigment are milled in a ball mill to prepare a glass frit.

Subsequently, the glass frit prepared through the dry process and the wet process may be applied onto the buffer layer by spray. The applied glass frit may be fired for 100 to 450 seconds in a temperature range of 600 to 900° C. and may be coated on the inner surface of the cavity 11 or the inner surface of the door 14 of the cooking appliance 1.

Hereinafter, embodiments are described with respect to examples.

EXAMPLES

Method for Preparation of Enamel Composition

An enamel composition having a composition ratio shown in Table 1 below was prepared. Raw materials of components of the enamel composition were sufficiently mixed in a V-mixer for three hours. Sodium carbonate ($Na_2CO_3$), potassium carbonate ($K_2CO_3$), and lithium carbonate ($Li_2CO_3$) were used as raw materials for $Na_2O$, $K_2O$, and $Li_2O$, respectively, and remaining components thereof were the same as those listed in Table 1. The mixed materials were sufficiently melted at 1300° C. for 1 hour and 30 minutes and quenched using a quenching roller to obtain a glass cullet.

The glass cullet obtained through the above process was controlled to have an initial particle size using a mill, for example, a ball mill, and passed through a 325-mesh sheave (ASTM C285-88) after grinding for about five hours using a jet mill. The particle size of the frit, which has not passed through the mesh sheave, was controlled to be 1 to 3 g and powder that has passed through the mesh sheave was used as an enamel frit composition.

TABLE 2

| Component (wt %) | Buffer layer |
| --- | --- |
| $SiO_2$ | 48.8 |
| $B_2O_3$ | 10.1 |
| $Na_2O$ | 15 |
| $K_2O$ | 10.7 |
| $Li_2O$ | 4.2 |
| NaF | 6 |
| $TiO_2$ | 2.4 |
| $Co_3O_4$ | 1 |
| NiO | 0.5 |
| $Fe_2O_3$ | 0.8 |
| $MnO_2$ | 0.5 |

Experimental Example

Performance evaluation was performed on specimens according to the Embodiments and Comparative Examples as follows and the results thereof are summarized in Table 1.

1. Evaluation of Cleaning Performance for Chicken Oil Contaminants 1 g of chicken oil as a contaminant was applied evenly and thinly onto a surface of specimen, which was prepared

TABLE 1

| Component | Embodiment | | | | | | | Comparative Example | | |
| --- | --- | --- | --- | --- | --- | --- | --- | --- | --- | --- |
| (wt %) | 1 | 2 | 3 | 4 | 5 | 6 | 7 | 1 | 2 | 3 |
| $SiO_2$ | 33.29 | 29.77 | 39.49 | 42.53 | 33.98 | 39.49 | 47.52 | 14.22 | 61.22 | 43.25 |
| $B_2O_3$ | 9.82 | 9.75 | 6.62 | 1.5 | 8.88 | 6.62 | 1.5 | 25.11 | 5.11 | 15.21 |
| $Na_2O$ | 11.76 | 9.7 | 12.03 | 7.76 | 9.74 | 11.95 | 7.76 | 9.7 | 1.23 | 7.76 |
| $K_2O$ | 3.92 | 2.6 | 3.34 | 2.92 | 2.6 | 3.34 | 2.92 | 3.99 | 2.12 | 2.92 |
| $Li_2O$ | 1.32 | 1.31 | 2.12 | 1.02 | 1.29 | 2.12 | 1.02 | 5.21 | 2.12 | 1.02 |
| NaF | 3.29 | 3.27 | 2.8 | 3.29 | 3.27 | 2.8 | 4.11 | 2.11 | 2.8 | 5.22 |
| $TiO_2$ | 15.3 | 12.79 | 12.97 | 15.29 | 12.21 | 12.97 | 15.29 | 12.79 | 5.22 | 13.9 |
| $MnO_2$ | 0 | 0.2 | 0 | 0 | 0.2 | 0.3 | 0 | 0 | 0 | 1.21 |
| $Fe_2O_3$ | 0 | 0.2 | 0 | 0 | 0.2 | 0 | 0.3 | 1.2 | 0 | 0 |
| ZnO | 6.62 | 9.91 | 9.05 | 8.2 | 9.91 | 9.05 | 1 | 8.12 | 8.24 | 1 |
| $MoO_3$ | 5.18 | 7.82 | 3.58 | 5.59 | 7.86 | 3.36 | 6.68 | 5.01 | 3.58 | 5.59 |
| $Bi_2O_3$ | 8.21 | 9.86 | 6.71 | 8.51 | 9.86 | 6.71 | 8.51 | 9.72 | 5.85 | 1.23 |
| $CeO_2$ | 1.29 | 2.82 | 1.29 | 3.39 | 0 | 1.29 | 3.39 | 2.82 | 1.29 | 1.69 |

Preparation of Specimen for Enamel Composition

A low-carbon steel sheet having an area of 200×200 (mm) and a thickness of 1 (mm) or less was prepared. A buffer layer having components shown in Table 2 below was formed on the sheet. The buffer layer was prepared in the same manner as the enamel composition mentioned above. The method for forming the buffer layer on the sheet is the same as the method for forming the enamel coating layer described below.

Frits prepared according to Embodiments 1 to 7 and Comparative Examples 1 to 3 using the enamel composition were sprayed onto the buffer layer using a corona discharge gun. A voltage of the discharge gun was controlled under the conditions of 40 to 100 kV and an amount of frits sprayed on the low-carbon steel sheet was 300 g/m². The low-carbon steel sprayed with the frit was fired at a temperature range of 830° C. to 870° C. for 300 seconds to 450 seconds to form a coating layer on one surface of the low-carbon steel. In this case, the coating layer was formed with a thickness of about 80 to 250 μm. As a result, the specimens were prepared according to Embodiments 1 to 7 and Comparative Examples 1 to 3.

by coating an enamel composition on a metal substrate (100×100 mm), using a brush. Subsequently, the specimen to which contaminants were applied was put into a thermostat and the contaminants were fixed in a temperature range of 250 to 290° C. for one hour. After fixing contaminants, the specimen was naturally cooled and a curing degree of each specimen was determined, followed by wiping the cured chicken oils with a force of 3 kgf or less using a frying pan cleaning sponge moistened with room-temperature water. A bar having a diameter of 5 cm and a flat bottom was used to uniformly wipe the contaminants on the surface of the specimen.

2. Cleaning Performance for Cherry Pie Contaminants 1 g of cherry pie as a contaminant was applied evenly and thinly using a brush to a specimen surface with which an enamel composition was coated on a metal substrate (100×100 mm). Subsequently, the specimen to which contaminants were applied was put into a thermostat and the contaminants were fixed in a temperature of about 220° C. for 30 minutes. After fixing the contaminants, the specimen was naturally cooled and the contaminants were burned at 400° C. for one hour. Subsequently, cured cherry pie contaminants were wiped off with a force of 3 kgf or less using a frying-pan cleaning sponge moistened with room-temperature water. A bar having a flat bottom and have a diameter of 5 cm was used to uniformly wipe the contaminants on the surface of the specimen.

In this case, a number of cleaning cycles was measured on the specimens. This is referred to as "the number of cleaning cycles". Cleaning performance evaluation indexes are described in Table 3.

TABLE 3

| Number of Cleaning Cycles | Level |
|---|---|
| 1 to 5 | LV. 5 |
| 6 to 15 | LV. 4 |
| 16 to 25 | LV. 3 |
| 26 to 50 | LV. 2 |
| 51 or more | LV. 1 |

3. Durability Evaluation

The specimens that have completed the cleaning test according to item 2 above were tested to evaluate durability, such as heat resistance and chemical resistance. The durability of each of the specimens was evaluated by determining a stain phenomenon. The stain phenomenon was evaluated. The surface of each of the specimens was examined and stain phenomenon was evaluated by quantifying a ratio of an area of residues or traces thereof to a total surface area. Evaluation criteria of stain is described in Table 4.

TABLE 4

| Stain Area Ratio | LEVEL |
|---|---|
| 0% | LV. 5 |
| less than or equal to 20% | LV. 4 |
| less than or equal to 50% | LV. 3 |
| less than or equal to 80% | LV. 2 |
| equal to or greater than 80% | LV. 1 |

TABLE 5

| | Embodiment | | | | | | | Comparative Example | | |
|---|---|---|---|---|---|---|---|---|---|---|
| Chicken oil cleaning performance | V.3 | V.5 | V.3 | V.5 | V.5 | V.5 | V.5 | V.2 | V.1 | V.2 |
| Cherry pie cleaning performance | V.3 | V.4 | V.4 | V.5 | V.4 | V.4 | V.4 | V.1 | V.1 | V.1 |
| Stain level | V.3 | V.4 | V.4 | V.5 | V.5 | V.5 | V.5 | V.1 | V0 | V.1 |

As described in Table 5 above, excellent cleaning performance and durability was determined according to embodiments. Comparative embodiments showed degraded cleaning performance due to poor silicate-based composition and poor durability due to the unstable glass composition compared to comparative examples.

Embodiments disclosed herein provide a novel enamel composition that enables a reduction in a heating time for cleaning. Embodiments disclosed herein also provide a novel enamel composition that may require no soaking in water to remove oil contaminants. Embodiments disclosed herein further provide a novel enamel composition that facilitates cleaning and has excellent durability, such as heat resistance and chemical resistance.

According to embodiments disclosed herein, in order to provide an enamel composition, that facilitates cleaning by reducing a time taken to heat other enamel compositions and facilitates cleaning with respect to oil contaminants at room temperature without soaking in water, the enamel composition may include 15 to 50 percent by weight (wt %) of $SiO_2$; 1 to 10 wt % of $B_2O_3$; 10 to 20 wt % of at least one of $Li_2O$, $Na_2O$, or $K_2O$; 1 to 5 wt % of $NaF$; 1 to 10 wt % of $ZnO$; and 20 to 50 wt % of at least one of $TiO_2$, $MoO_3$, $Bi_2O_3$, $CeO_2$, $MnO_2$, or $Fe_2O_3$. The enamel composition may include 5 to 20 wt % of $TiO_2$ and 10 to 20 wt % of at least one of $MoO_3$, $Bi_2O_3$, or $CeO_2$.

Embodiments disclosed herein provide a novel enamel composition that may not be required for determining adhesion with a base steel sheet. According to embodiments disclosed herein, the enamel composition may significantly reduce a time taken to heat other enamel compositions. Accordingly, the heating time may be shortened due to the enamel composition, thereby saving energy used for cleaning.

The enamel composition may also facilitate the cleaning with respect to contaminants, particularly oil contaminants, at room temperature without soaking in water such that users may easily clean it. As such, the enamel composition may improve hygiene of the cooking appliance.

Further, according to embodiments disclosed herein, the enamel composition may have an optimal composition ratio of silicate-based component, thereby facilitating cleaning and having excellent durability such as heat resistance and chemical resistance. Furthermore, the enamel composition may be formed on an intermediate buffer layer disposed on the base steel sheet, thereby requiring no expensive raw material having adhesion with the base steel sheet.

Although embodiments have been described above, embodiments are not limited to the embodiments disclosed herein, and various modifications can be made by those skilled in the art within the scope of the technical idea. Further, even if working effects obtained based on configurations of embodiments are not explicitly described in the description of embodiments, effects predictable based on the corresponding configuration has to be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An enamel composition, consisting of:
   15 to 50 percent by weight (wt %) of silicon dioxide ($SiO_2$);
   1 to 10 wt % of boron oxide ($B_2O_3$);
   10 to 20 wt % of at least one of lithium oxide ($Li_2O$), sodium oxide ($Na_2O$), or potassium oxide ($K_2O$);
   1 to 5 wt % of sodium fluoride (NaF);
   1 to 10 wt % of zinc oxide (ZnO);
   10 to 30 wt % of at least one of titanium dioxide ($TiO_2$), manganese dioxide ($MnO_2$), or Iron oxide ($Fe_2O_3$);
   and 10 to 20 wt % of molybdenum oxide ($MoO_3$), bismuth oxide ($Bi_2O_3$), and cerium dioxide ($CeO_2$) in total, wherein the enamel composition is a silicate-based glass composition.

2. A cooking appliance, comprising:
   a cavity configured to define a cooking chamber;
   a door configured to selectively open and close the cooking chamber;
   at least one heating source configured to supply heat to the cooking chamber;
   a buffer layer coated on an inner surface of the cavity or an inner surface of the door;
   a coating layer coated on the buffer layer and formed using the enamel composition of claim 1.

* * * * *